July 14, 1925.
G. C. SAVAGE
WINDSHIELD
Filed April 17, 1923
1,546,256
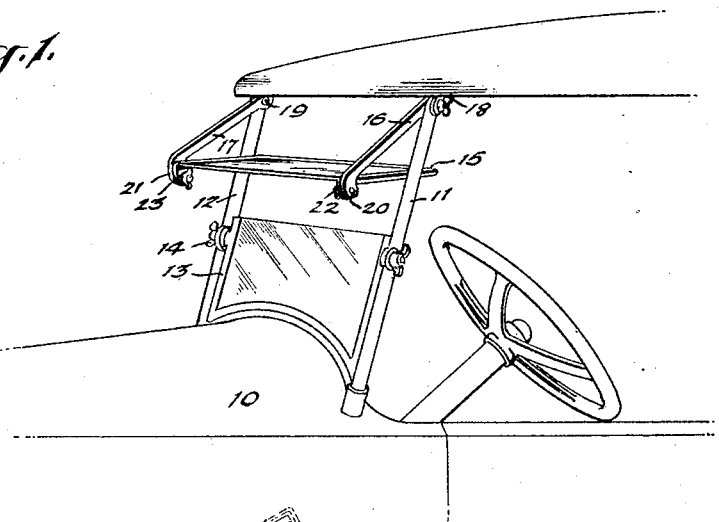
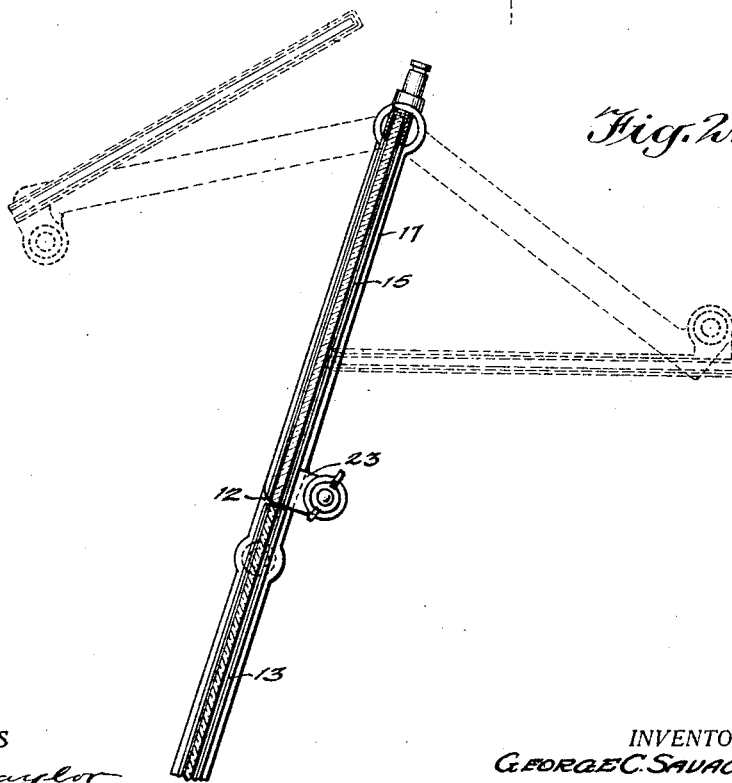
WITNESSES
INVENTOR
GEORGE C. SAVAGE
BY
ATTORNEYS Patented July 14, 1925.

1,546,256

UNITED STATES PATENT OFFICE.

GEORGE COLLINS SAVAGE, OF GLASTONBURY, CONNECTICUT.

WINDSHIELD.

Application filed April 17, 1923. Serial No. 632,719.

*To all whom it may concern:*

Be it known that I, GEORGE C. SAVAGE, a citizen of the United States, and a resident of Glastonbury, in the county of Hartford and State of Connecticut, have invented new and useful Improvements in Windshields, of which the following is a full, clear, and exact description.

This invention relates to wind shields and was primarily designed for use in the construction of motor vehicle wind shields.

When motor vehicles are being operated during rain storms the wind shield becomes covered with drops of rain and it is almost impossible for the driver to observe the road. In order to permit progress with any degree of safety it is necessary from time to time to remove these drops of rain obstructing the view. If the wind shield is so constructed that it is impossible for the driver to wipe the outer surface from within the car it compels him to expose himself to the weather in order to clear the wind shield. In many cases where it is possible to wipe the wind shield from within the car the difficulty of accomplishing this cleaning of the outer surface of the wind shield is so great as to compel the driver to expose himself to the weather.

The general object of this invention is the provision of a cheap and simple construction of a mounting for the sashes of wind shields which permits the sash to be so manipulated as to make possible the cleaning of the outer surface of the wind shield from within the car.

This object is accomplished by pivotally mounting on the vertical supporting posts of the wind shield depending arms, pivotally mounting between said depending arms the upper wind shield sash, and providing in conjunction with the sash and depending arms means for fixing them in any desired position relative to one another and to the supporting posts.

This and other objects of the invention will be more clearly understood from the following detailed description and accompanying drawings.

Figure 1 is a perspective view of a wind shield showing the device;

Figure 2 is a vertical section through the wind shield showing the construction of the mounting for the upper sash.

Referring to the above-mentioned drawings, a motor vehicle 10 provided with a wind shield including vertical supporting members 11 and 12 is shown. Pivotally mounted between these vertical supporting members is a lower sash 13. Wing nuts 14 are provided for clamping the lower sash in any desired position relative to the vertical supporting members 11 and 12.

The mounting for the upper sash 15 of the wind shield includes two depending arms 16 and 17 having their upper ends pivotally connected to the vertical supporting members 11 and 12 at 18 and 19, respectively. The pivot mountings shown at 18 and 19 are of ordinary construction including threaded pins extending through the depending arms and vertical supporting members, and wing nuts mounted on said pins for drawing the depending arms tightly against the vertical supports to fix them in any position relative to the vertical supports. These wing nuts are located in a position which is accessible to the driver from within the car. The depending arms 16 and 17 have inwardly extending projections 20 and 21 formed on their lower ends, respectively. Inwardly extending projections 22 and 23 are formed on the lower corners of the sash 15. These projections 22 and 23 extend parallel to the projections 20 and 21, respectively, and are pivotally connected thereto. The means for pivotally connecting the projections include bolts provided with wing nuts. The wing nuts are located on the inside of the projections so that they may be conveniently operated by the driver from within the motor vehicle 10.

In wiping the outer surface of the lower section of a wind shield having the upper section mounted as described above, the driver swings the depending arms 16 and 17 outward, carrying the sash 15 outward. Then it is possible to wipe the lower section from within the car. In order to wipe the upper section of the wind shield the sash 15 is rotated inward about its pivot points, positioning the outer surface of the upper section of the wind shield within easy reach of the driver as he sits in the car.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. In a wind shield including vertical supporting members and an upper sash, a mounting for the upper sash comprising a pair of depending arms having their upper ends pivotally mounted on the vertical supporting members, inwardly extending projections formed on the lower ends of said depending arms, inwardly extending projections formed on the lower corners of said upper sash, said sash projections lying parallel to said depending arm projections, means for pivotally connecting the projections, means provided in conjunction with said connecting members for clamping the projections together so as to fix the sash in any desired position relative to the depending arms, and means for fixing the depending arms in any desired position relative to the vertical supporting members.

2. In a windshield, including vertical standards and an upper sash, a mounting for the upper sash comprising a pair of depending arms having their upper ends pivotally mounted on the upper ends of the vertical standards, means for pivotally connecting the lower ends of the arms to the sash, means provided in conjunction with said pivotal connecting means and operated from a point within the perimetrical bounds of said upper sash for clamping the arms and sash together so as to fix the sash in any desired position relative to the depending arms, and means for fixing the depending arms in any desired position relative to the vertical standards.

GEORGE COLLINS SAVAGE.